March 11, 1924.

C. O. DEIS

CUSPIDOR FOR VEHICLES

Filed Oct. 20, 1922

1,486,283

Inventor
Calvin O. Deis
By Frease and Bond
Attorneys

Patented Mar. 11, 1924.

1,486,283

UNITED STATES PATENT OFFICE.

CALVIN O. DEIS, OF DOVER, OHIO.

CUSPIDOR FOR VEHICLES.

Application filed October 20, 1922. Serial No. 595,792.

*To all whom it may concern:*

Be it known that I, CALVIN O. DEIS, a citizen of the United States, residing at Dover, in the county of Tuscarawas and State of Ohio, have invented a new and useful Cuspidor for Vehicles, of which the following is a specification.

This invention relates to cuspidors and has more particular reference to a device of the kind especially designed for use in enclosed vehicles, such as automobiles, street cars, railway coaches and the like.

The objects of the invention are to provide a sanitary cuspidor comprising an opening in the floor of the vehicle, normally closed by a hinged cover, means being provided upon the cover for raising the same and at the same time automatically lighting a light directed toward the opening, the cuspidor being located beneath the opening in the floor and provided with an open, lower end, a cover for the open, lower end of the cuspidor being carried by the hinged door and arranged to be moved across the open end of the cuspidor as the door is opened.

The above and other objects may be attained by constructing the device in the manner illustrated in the accompanying drawings, in which—

Figure 2:
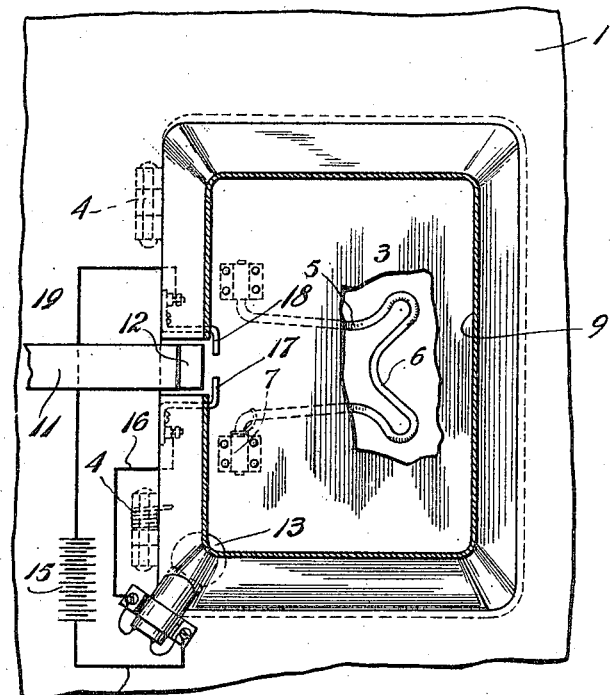
Figure 1:
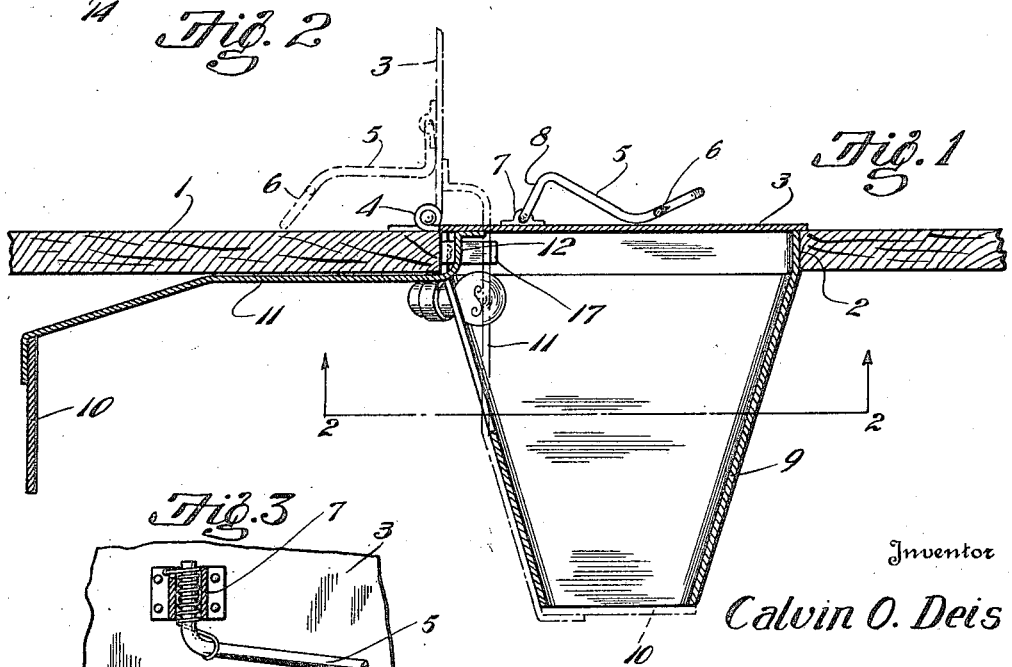
Figure 3:
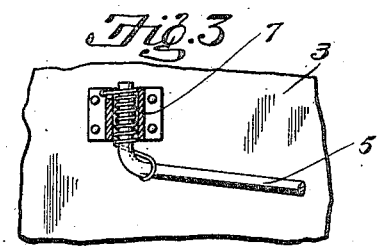

Figure 1 is a sectional view through the cuspidor embodying the invention;

Fig. 2, a section on the line 2—2, Fig. 1;

Fig. 3, a detail view of one end of the lever upon the hinged door; and

Figure 4:
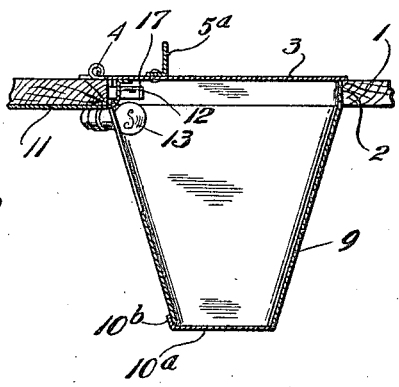

Fig. 4, a sectional view through a slightly modified form of the device.

Similar numerals refer to similar parts throughout the drawings.

A portion of the floor of an automobile or other vehicle is indicated at 1, an opening 2 being made in the floor and normally closed by the hinged cover 3 connected to one side edge of the opening, as by the spring hinges 4 arranged to normally hold the cover in the closed position, as shown in the drawings.

A lever 5, preferably of the form illustrated in Figs. 1, 2 and 3, and provided with the recessed forward end 6 to accommodate the heel of the operator, is hingedly mounted upon the door 3, adjacent to the hinged edge thereof as by the spring hinges 7, arranged to normally hold the lever in the lowered position, shown in Figs. 1 and 2. The lever preferably has the angular portion 8 adjacent to the hinged end thereof, the forward, recessed end being upturned to permit the heel to be easily engaged therewith.

The casing 9 of the cuspidor is secured at the upper end within the opening 2, and is preferably tapered downward as illustrated, the lower end thereof being open and arranged to be covered by the lid 10 carried upon the lower end of the rigid arm 11, having the angular end 12 which is fixed to the under side of the hinged door 3.

In order that the interior of the cuspidor may be illuminated when the hinged door is raised, an electric lamp as indicated at 13, is mounted beneath the floor of the vehicle and projects through one side wall of the casing 9 of the cuspidor, the lamp being connected as by a wire 14 with the battery 15 which may be the usual battery of the automobile, the other side of the lamp being connected as by the wire 16 with an angular contact plate 17 mounted within the casing of the cuspidor and adjacent to the hinged edge of the door 3.

A similar angular contact plate 18 is spaced from the plate 17 and connected by means of a wire 19 to the battery 15, the circuit to the lamp thus being broken between the angular contact plates 17 and 18. The arm 11 is formed of metal, and as shown in Figs. 1 and 2, is located between the contact plates 17 and 18 and normally held out of engagement with said plates when the door 3 is in closed position.

When the door 3 is raised to the open position, as shown in dotted lines in Fig. 1, the arm 11 will engage the angular contacts 17 and 18, closing the circuit from the battery to the lamp, while the lid 10 carried upon the lower end of the arm will, at the same time, be moved into position at the open lower end of the casing 9.

In Fig. 4 is shown a slightly modified form of the invention in which a rigid plate 5ª is fixed upon the hinged door instead of the pivoted lever 5, and the lower end of the casing 9 of the cuspidor is closed by a lid 10ª formed of flexible rubber or the like fixed to the casing at one edge, as shown at 10ᵇ, this lid being arranged to normally close the end of the cuspidor and so designed that the weight of cigar butts, ashes or the like, thrown into the cuspidor, will cause the lid to momentarily open sufficiently to eject the same.

Normally, the parts are in the position shown in Figs. 1 and 2, and when it is desired to use the cuspidor, the operator engages the recessed end of the lever 5 with his foot, raising the lever until the angular portion 8 thereof engages the upper surface of the door, when a further pressure upon the lever moves the door into the dotted position shown in Fig. 1.

As the door is thus swung into the open position, the arm 11 carried thereby is swung into a substantially vertical position, moving the lid 10 over the open, lower end of the body of the cuspidor, preventing any drafts or gusts of wind from blowing up through the open door and carrying ashes or other material from the cuspidor back into the interior of the vehicle.

As soon as the user removes his foot from the lever 5, the spring hinges will cause the hinged door to close, returning the arm 11 to the normal position and removing the lid 10 from the lower end of the cuspidor, the lamp 13 being also extinguished and the lever 5 returned to its initial position.

I claim:—

1. A cuspidor including an open ended casing, a hinged door normally closing the upper end of the casing, an angular arm rigidly fixed to the door and a lid rigidly fixed upon said arm for closing the lower end of the casing when the door is opened.

2. A cuspidor including an open ended casing, a hinged door normally closing the upper end of the casing, an angular lever hinged upon the top of the door and arranged to be swung backward to open the door and means for normally holding the lever in lowered position.

3. In a cuspidor of the character described, a hinged door normally closing the cuspidor, and a lever arranged to be operated by foot to open the door and pivotally connected at one end to the door, said lever being bent upwardly at an angle from the pivotal point, then downward and forward to a point contacting with the door, the free end of the lever being bent upward and forward from said point and a notch in its end to fit the heel, spring means being provided for normally holding the lever in contact with the door.

CALVIN O. DEIS.